(12) United States Patent
Yamaguchi

(10) Patent No.: US 10,897,173 B2
(45) Date of Patent: Jan. 19, 2021

(54) INSULATION PAPER AND STATOR OF ROTARY ELECTRIC MACHINE

(71) Applicant: HONDA MOTOR CO., LTD., Tokyo (JP)

(72) Inventor: Tadashi Yamaguchi, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 60 days.

(21) Appl. No.: 16/149,328

(22) Filed: Oct. 2, 2018

(65) Prior Publication Data

US 2019/0109505 A1  Apr. 11, 2019

(30) Foreign Application Priority Data

Oct. 5, 2017 (JP) ................. 2017-195405

(51) Int. Cl.
*H02K 3/34* (2006.01)
*H02K 3/12* (2006.01)
*H02K 1/16* (2006.01)

(52) U.S. Cl.
CPC ............ *H02K 3/345* (2013.01); *H02K 1/16* (2013.01); *H02K 3/12* (2013.01)

(58) Field of Classification Search
CPC ................................. H02K 3/345; H02K 1/16
See application file for complete search history.

(56) References Cited

U.S. PATENT DOCUMENTS

| | | | | |
|---|---|---|---|---|
| 2,180,983 A * | 11/1939 | Hall | ....... | H02K 3/345 310/215 |
| 6,995,491 B2 * | 2/2006 | Kimura | ....... | H02K 3/345 310/215 |
| 8,446,061 B2 * | 5/2013 | Nakayama | ....... | H02K 3/345 310/214 |
| 9,590,461 B2 * | 3/2017 | Kaneiwa | ....... | H02K 3/345 |
| 2004/0183391 A1 * | 9/2004 | Kimura | ....... | H02K 3/345 310/215 |
| 2005/0280327 A1 | 12/2005 | Neet | | |
| 2005/0280328 A1 | 12/2005 | Neet | | |
| 2014/0062250 A1 * | 3/2014 | Kaneiwa | ....... | H02K 3/345 310/215 |

FOREIGN PATENT DOCUMENTS

| | | |
|---|---|---|
| CN | 1973419 A | 5/2007 |
| EP | 0961386 A1 | 12/1999 |
| JP | S53-132602 U | 10/1978 |
| JP | 2014-050145 A | 3/2014 |
| JP | 2017-077095 A | 4/2017 |

OTHER PUBLICATIONS

Jul. 23, 2019, Japanese Office Action issued for related JP Application No. 2017-195405.
Apr. 9, 2020, Chinese Office Action issued for related CN Application No. 201811127572.0.

* cited by examiner

*Primary Examiner* — Alexander Talpalatski

(74) *Attorney, Agent, or Firm* — Paratus Law Group, PLLC

(57) ABSTRACT

There is provided an insulation paper to be disposed between a slot formed in a stator core and a coil inserted into the slot. A crease is provided in advance at a folding position where the insulation paper is to be folded when disposed in the slot. The crease is provided in an area of the insulation paper excluding both end portions thereof.

3 Claims, 8 Drawing Sheets

INSULATION PAPER AND STATOR OF ROTARY ELECTRIC MACHINE

CROSS-REFERENCE TO RELATED APPLICATIONS

The present application claims the benefit of priority of Japanese Patent Application No. 2017-195405, filed on Oct. 5, 2017, the content of which is incorporated herein by reference.

TECHNICAL FIELD

The present invention relates to an insulation paper to be provided on a stator of a rotary electric machine and a stator of a rotary electric machine including the insulating paper.

BACKGROUND ART

As illustrated in FIG. 8, a stator 30 of a rotary electric machine includes a stator core 31 and a coil 32. The stator core 31 includes a plurality of teeth 33 arranged in a circumferential direction (direction of an arrow C) thereof which are projected inward in a radial direction (direction of an arrow B) of the stator core 31. A slot 34 is formed between adjacent teeth 33. The coil 32 is inserted into the slot 34. An insulation paper 35 is provided between the coil 32 and a surface 34a defining the slot 34 in a state of being folded to surround the coil 32 along an axial direction of the rotary electric machine (see JP-A-2017-77095).

As illustrated in FIG. 9, the insulation paper 35 is formed with, on an intended folding line (imaginary line) L indicated by a dashed line, a crease 36 to make it easy to fold the insulation paper 35 at a predetermined location so as to surround the coil 32. The crease 36 is formed from one end to the other end of the insulation paper 35 on the intended folding line L such that the insulation paper 35 can be easily folded.

As illustrated in FIG. 10, a crack K may easily occur on a portion of the insulation paper 35 which is protruded from an end surface 31a of the stator core 31 in an axial direction (direction of an arrow A) thereof. This is because a coil end portion 32e of the coil 32, that is, a portion of the coil 32 on an outer side of the stator core 31 in the axial direction is curved on an outer side of the end surface of the stator core 31, so that stress occurs at an end portion 35a of the insulation paper 35 which is in contact with the coil end portion 32e. The crack K may occur on the insulation paper 35 along the crease 36 with one end of the crease 36 in the axial direction as a starting point since stress is also applied to a folding location of the end portion 35a where the crease 36 is formed. There is a high possibility that the crack K occurs when curvature of the coil end portion 32e on the outer side of the end surface of the stator core 31 is large, and thus, the possibility that the crack K occurs tends to increase due to miniaturization of the rotary electric machine.

SUMMARY

Accordingly, an object of the present invention is to provide an insulation paper and a stator of a rotary electric machine which are capable of suppressing occurrence of a crack.

According to a first aspect of the present invention, there is provided an insulation paper (e.g., insulation papers 16, 16A, 16B in embodiments to be described below) to be disposed between a slot (e.g., a slot 15 in the embodiments) formed in a stator core (e.g., a stator core 11 in the embodiments) and a coil (e.g., a coil 12 in the embodiments) inserted into the slot, wherein a crease (e.g., a crease 17 in the embodiments) is provided in advance at a folding position where the insulation paper is to be folded when disposed in the slot, and wherein the crease is provided in an area (e.g., an area 16b in the embodiments) of the insulation paper excluding both end portions (e.g., both end portions 16a in the embodiments) thereof.

According to a second aspect of the present invention, in the insulation paper of the first aspect, an adhesive layer (e.g., an adhesive layer 19 in the embodiments) is provided on at least one surface of the insulation paper, and the adhesive layer is provided in the area of the insulation paper excluding the both end portions thereof.

According to a third aspect of the present invention, in the insulation paper of the second aspect, the crease extends to an outer side of the adhesive layer.

According to a fourth aspect of the present invention, there is provided a stator of a rotary electric machine (e.g., a stator 10 in the embodiments) including:

a stator core (e.g., a stator core 11 in the embodiments) including a plurality of slots (e.g., slots 15 in the embodiments) in a circumferential direction thereof;

a coil (e.g., a coil 12 in the embodiments) inserted into each of the slots; and an insulation paper (e.g., an insulation paper 16 in the embodiments) of any one of the first to third aspects disposed between each of the slots and the coil, wherein the crease is provided only on an inner side of an end surface of the stator core.

Effects

According to the first aspect of the present invention, a crease is formed at a folding position where the insulation paper is to be folded when disposed in the slot. Therefore, occurrence of a crack starting from the crease can be suppressed even if stress acts on both end portions of the insulation paper due to contact with the coil end portion.

According to the second aspect of the present invention, it is possible to prevent a decrease in folding property of the insulation paper due to the adhesive layer by the crease provided on the adhesive layer.

According to the third aspect of the present invention, since the crease extends to the outer side of the adhesive layer, the folding property can be improved. Since the crease is not formed on the both end portions of the insulation paper, occurrence of a crack starting from the crease can be suppressed even if stress acts on the both end portions of the insulation paper due to contact with the coil end portions.

According to the fourth aspect of the present invention, the crease is formed at the folding position where the insulation paper is to be folded when disposed in the slot, and the crease is provided on an area other than both end portions of the insulation paper and is provided only on an inner side of an end surface of the stator core. Therefore, occurrence of a crack starting from the crease can be suppressed even if stress acts on the both end portions of the insulation paper due to contact with the coil end portion.

DETAILED DESCRIPTION OF EMBODIMENT

Figure 1:
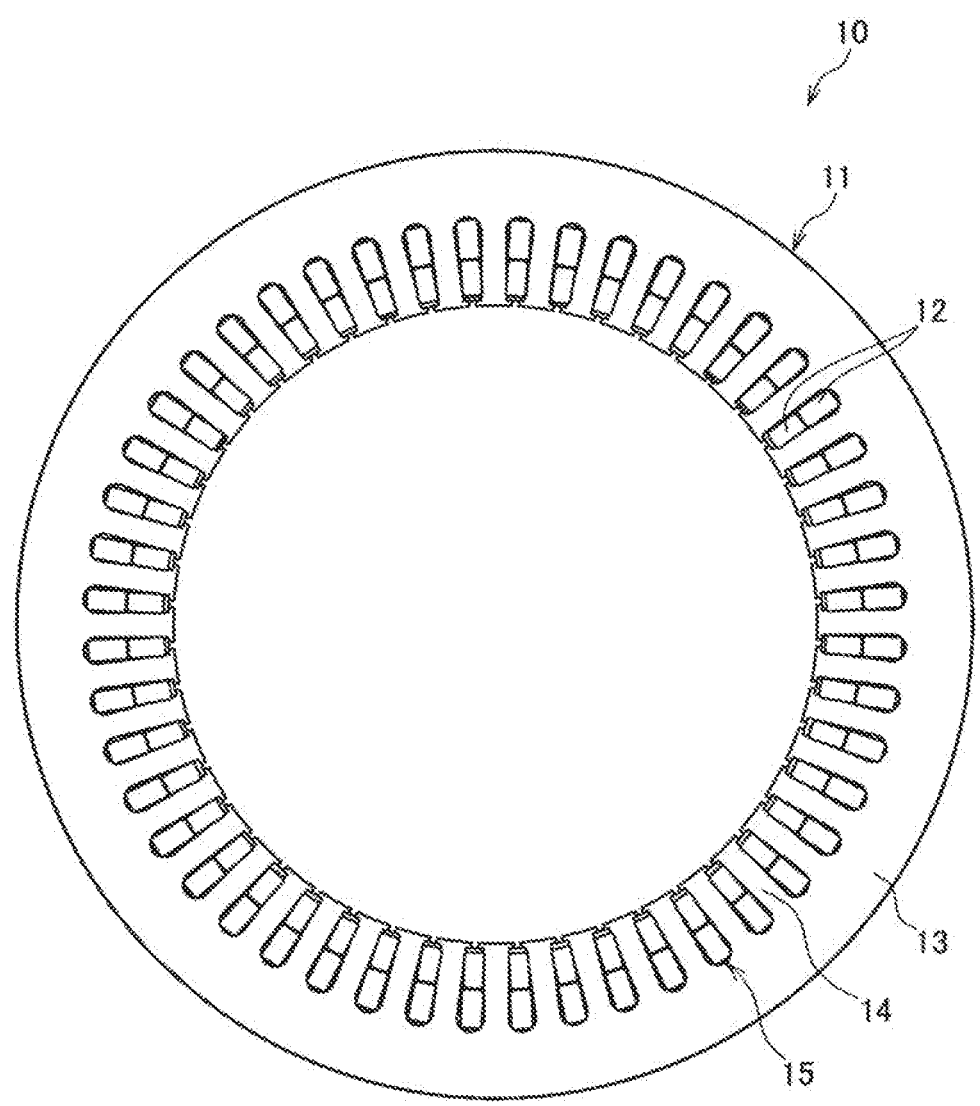
FIG. 1 is a radial sectional view of a stator of a rotary electric machine according to a first embodiment.

Embodiments of the present invention are described below with reference to the drawings. It is assumed that the drawings are seen in directions of reference numerals.

First Embodiment

FIG. 1 is a radial sectional view of a stator of a rotary electric machine according to a first embodiment. A stator 10 in FIG. 1 is combined with a rotor (not illustrated) to be provided inside the stator 10 to constitute the rotary electric machine. The rotary electric machine is configured such that the rotor is rotated by energizing a coil 12 wound around teeth 14 of the stator 10. The rotary electric machine may be mounted on a vehicle as a drive source thereof.

The stator 10 includes a stator core 11 and the coil 12. The stator core 11 is configured by laminating a plurality of steel plates. Each of the steel plates is a plate-like member including an annular stator yoke 13, a plurality of teeth 14 projected radially inward from the stator yoke 13 at equal intervals, and slots 15 formed at equal intervals in a circumferential direction between adjacent teeth 14. The steel plates are formed by punching an electromagnetic steel plate. When laminating the plurality of steel plates, a plurality of slots 15 penetrating in an axial direction are formed in the stator core 11 at equal intervals in a circumferential direction. The coil 12 of three phases (U-phase, V-phase, and W-phase) wound around the plurality of teeth 14 by distributed winding are inserted into the slots 15.

Figure 2:
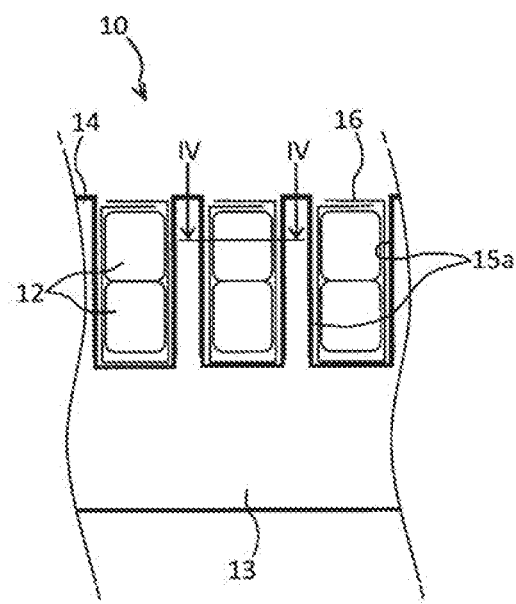
FIG. 2 is a schematic view in which teeth arranged in a circumferential direction of the stator according to the first embodiment are expanded linearly.

FIG. 2 is a schematic view in which teeth arranged in a circumferential direction of the stator 10 according to the first embodiment are expanded linearly. As illustrated in FIG. 2, for example, two coils 12 having rectangular sections are disposed in the radial direction in each of the slots 15. The number of the coils 12 in the slots 15 may be set appropriately. An insulation paper 16 is disposed along an axial direction of the rotary electric machine between the coils 12 in the slots 15 and a surface 15a defining the slots 15. The insulation paper 16 is disposed to surround the two coils 12 in the slot 15.

Figure 3:
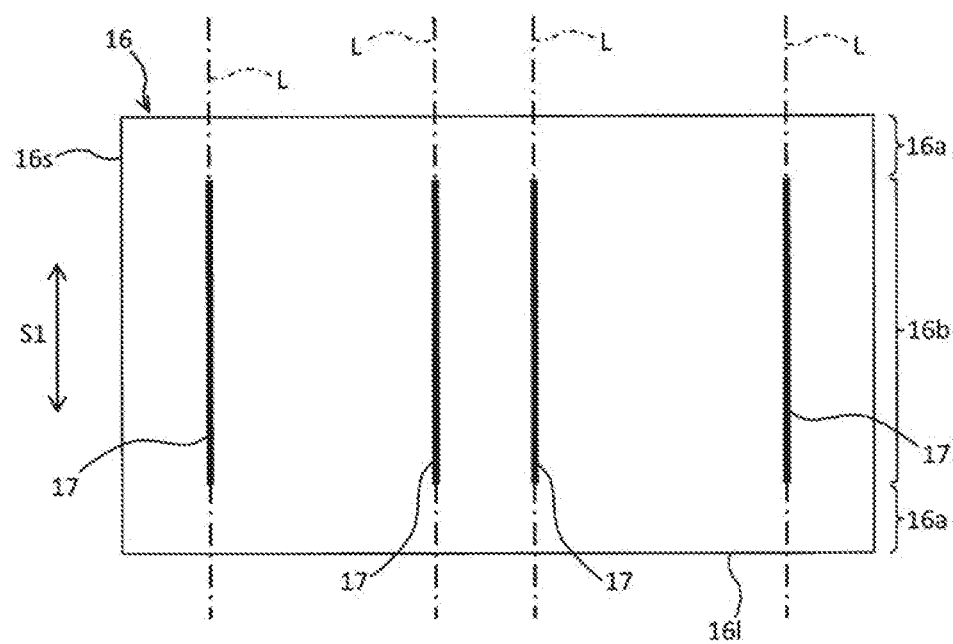
FIG. 3 is a plan view of an insulation paper according to the first embodiment.
Figure 4:
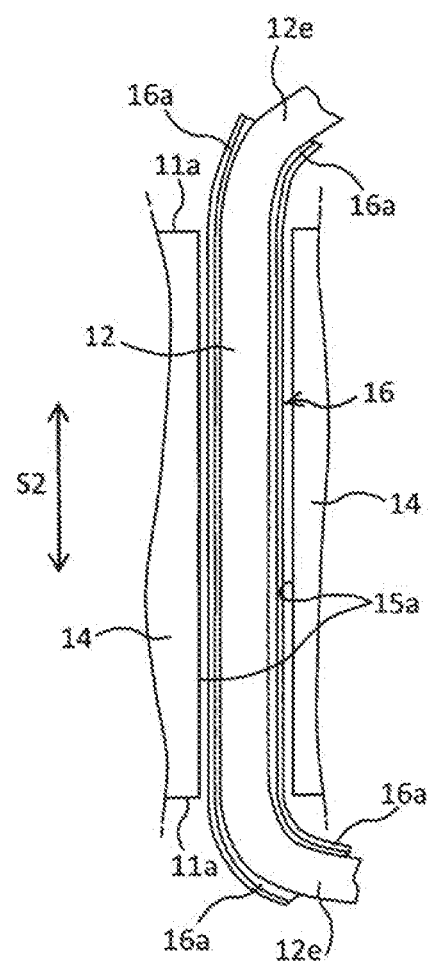
FIG. 4 is a partial sectional view of the stator according to the first embodiment.

FIG. 3 is a plan view in which the insulation paper 16 is unfolded. FIG. 4 is a sectional view taken along a line IV-1V in FIG. 2. An arrow S1 in FIG. 3 and an arrow S2 in FIG. 4 indicate the axial direction of the stator core 11. A direction of the arrow S2 in FIG. 4 in a state where the insulation paper 16 is disposed in the slots 15 coincides with a direction of the arrow S1 in FIG. 3.

As illustrated in FIG. 3, the insulation paper 16 is a rectangular insulation paper. A dimension of a short side 16s of the insulation paper 16 (a dimension in the direction of the arrow S1) is longer than a dimension of the stator core 11 in the axial direction, and a dimension of a long side 16l of the insulation paper 16 is sufficient to surround the coils 12 inserted into one slot 15. A crease 17, which makes it easy to fold the insulation paper 16 in predetermined location so as to surround the coil 12, is provided on the insulation paper 16 in advance on each of four intended folding lines L which are arranged in a direction of the long side 16l and parallel to the short side 16s. The four intended folding lines L are imaginary lines extending in the axial direction at positions corresponding to four corners formed on the insulation paper 16 when the insulation paper 16 is disposed in the slot 15 and do not have to be actual lines on the insulation paper 16. Meanwhile, the crease 17 is provided at a folding position where the insulation paper 16 is to be folded when disposed in the slot 15. As illustrated in FIG. 3, the crease 17 is provided in an area 16b of the insulation paper excluding both end portions 16a thereof in the direction of the arrow S1. When the insulation paper 16 is disposed in the slot 15 as illustrated in FIG. 4, the crease 17 is preferably not provided on a portion where the insulation paper 16 is protruded in the axial direction from both end surfaces 11a of the stator core 11 and is preferably provided only on an inner side from the end surfaces 11a of the stator core 11.

The crease 17 is formed, for example, by applying embossing processing in which one surface of the insulation paper 16 is locally dented and the other surface is protruded at the same position thereof at the same time. Such embossing processing is applied, for example, by pressing the insulation paper 16 firmly between a first roller including an embossing processing surface having a crease-like convex portion and a second roller pressed to the first roller. Further, the crease 17 may also be formed by sandwiching, with pressure, a location where the crease 17 is to be formed in a state where the insulation paper 16 is folded at the intended folding lines L.

In this manner, the crease 17 is formed on the insulation paper 16 of the first embodiment in a folding position where the insulation paper 16 is to be folded when disposed in the slot 15. Accordingly, the insulation paper 16 can be easily folded to surround the coils 12 in the slot 15, and the folded insulation paper 16 can be easily inserted into the slot 15.

Figure 8:
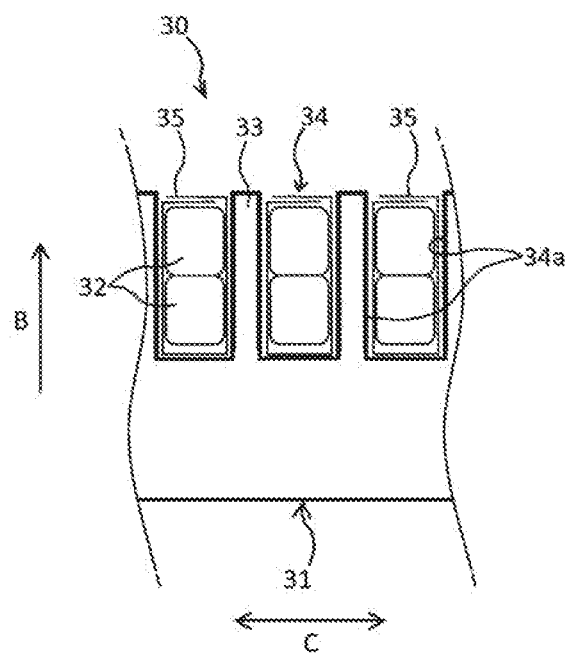
FIG. 8 is a partial sectional view of a related-art stator.
Figure 9:
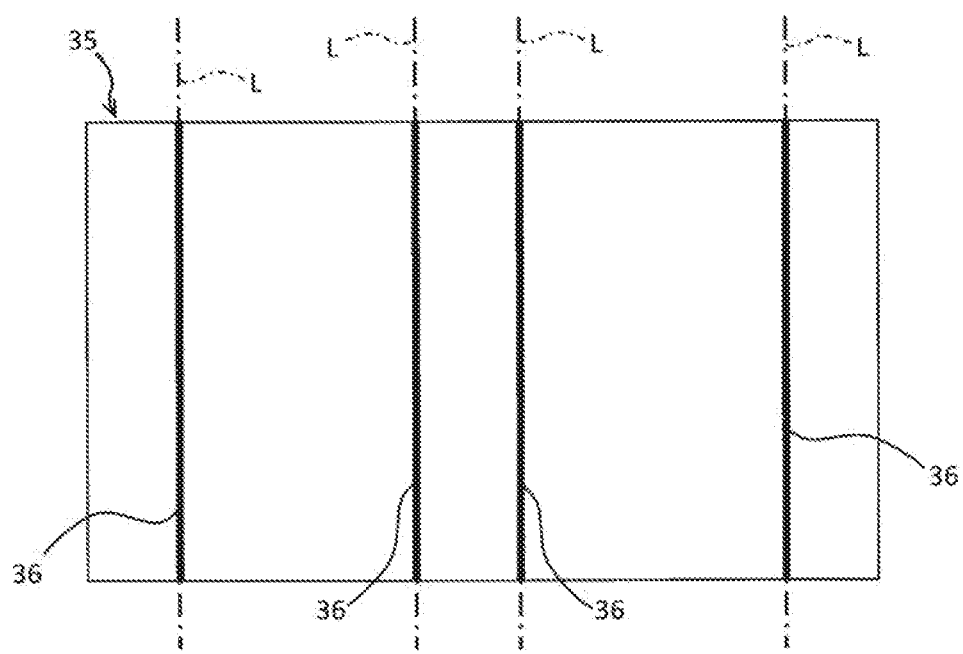
FIG. 9 is a plan view of a related-art insulation paper.
Figure 10:
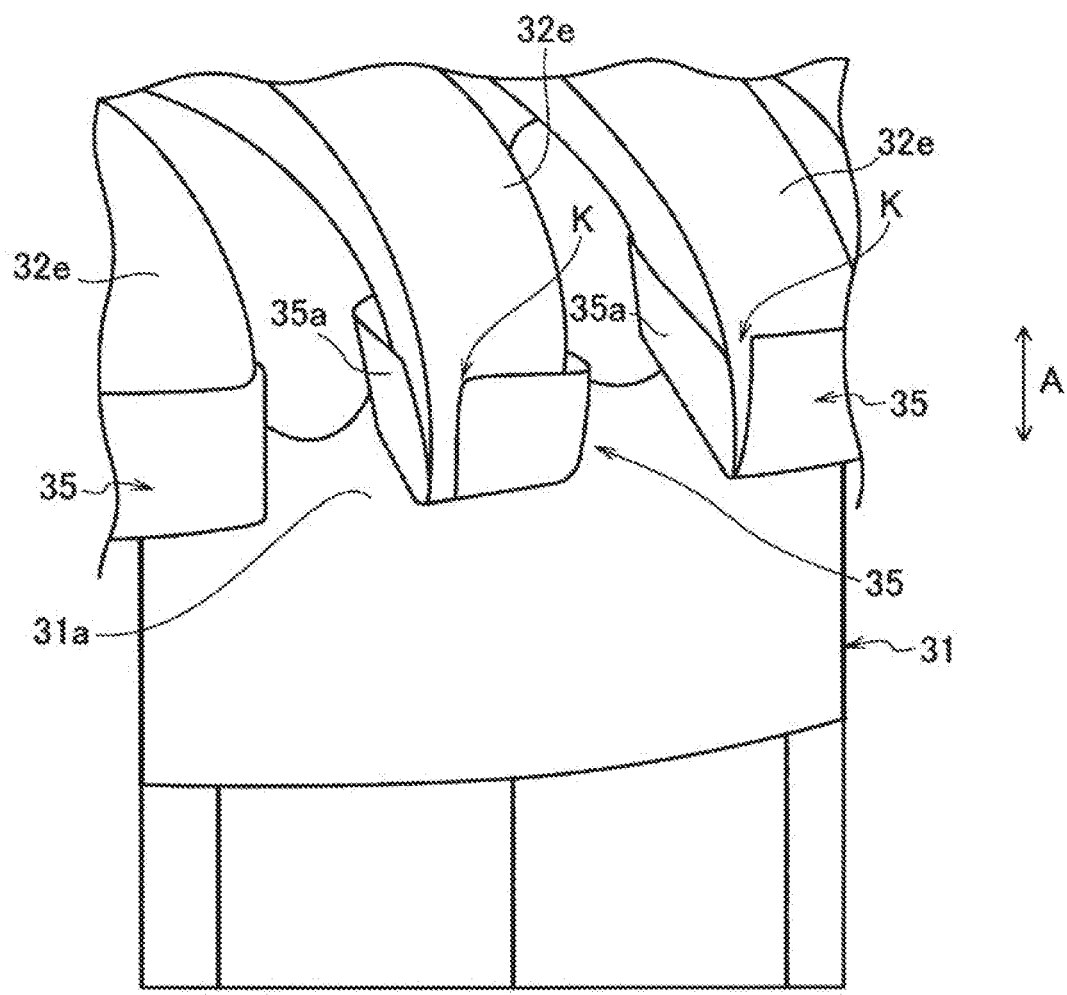
FIG. 10 is a partial perspective view of the related-art stator.

As illustrated in FIG. 4, the both end portions 16a of the insulation paper 16 provided to the stator core 11 are protruded in the axial direction from the both end surfaces 11a of the stator core 11 respectively, so that the end portions 16a receive stress from coil end portions 12e of the coils 12. In a related-art insulation paper 35 illustrated in FIGS. 8 to 10, a crack may occur along the crease 36 with one end of the crease 36 (see FIG. 9) in the axial direction as a starting point, which is provided on parts corresponding to the both end portions 16a. However, since the crease 17 is formed in the area 16b of the insulation paper 16 of the first embodiment excluding the both end portions 16a thereof, neither of the end portions 16a of the insulation paper 16 does not become a starting point, and a crack will not occur even if the stress received from the coil end portions 12e acts on the both end portions 16a. As described above, the insulation paper 16 of the first embodiment can prevent occurrence of a crack starting from the crease 17.

Second Embodiment

Figure 5:
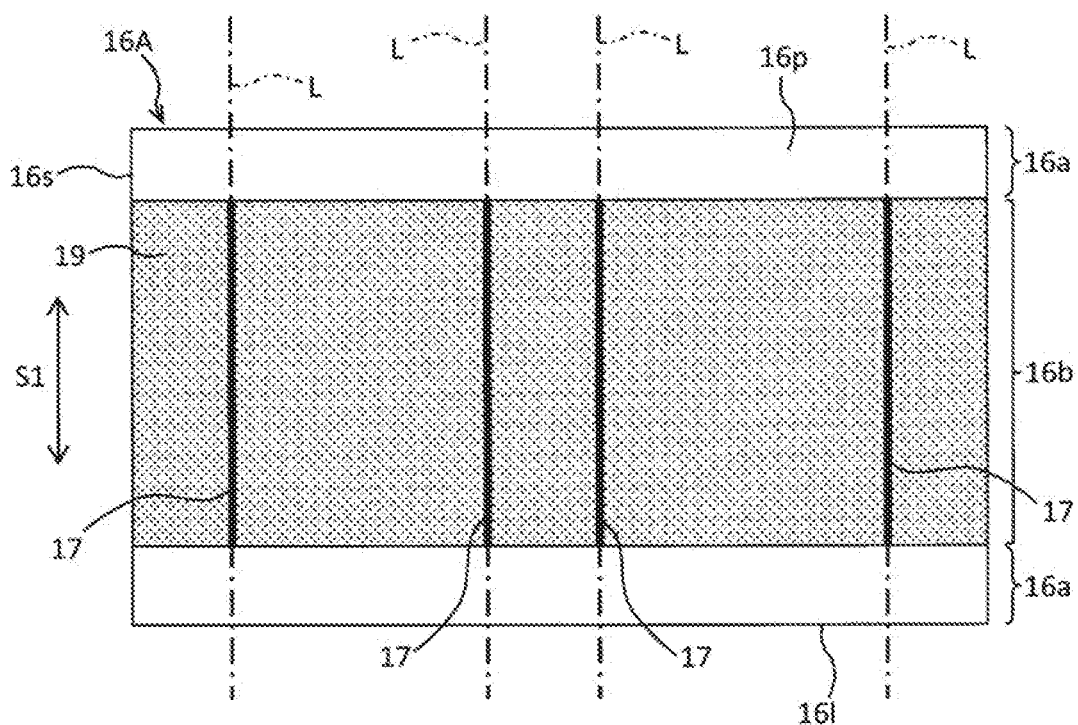
FIG. 5 is a plan view of an insulation paper according to a second embodiment.
Figure 6:
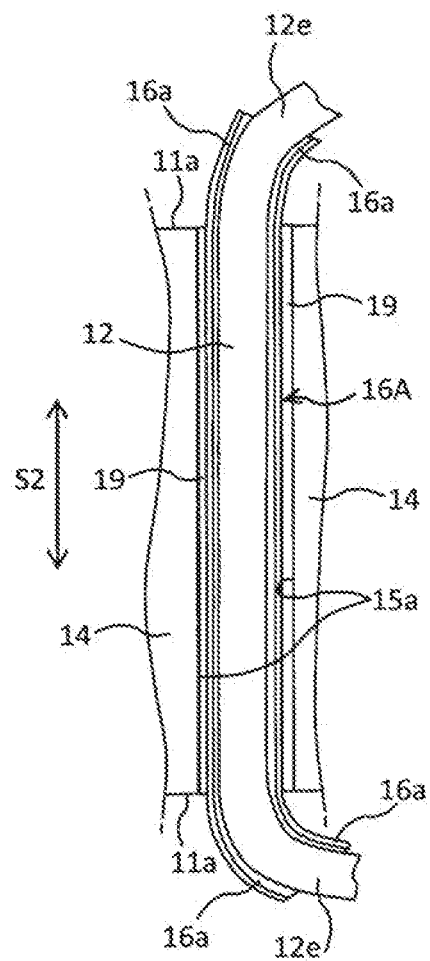
FIG. 6 is a partial sectional view of a stator according to the second embodiment.

FIG. 5 is a plan view in which an insulation paper 16A according to a second embodiment is unfolded. FIG. 6 is a sectional view taken along a line in FIG. 2. In the following description, elements common to those described in the first embodiment are denoted by the same reference numerals or corresponding reference numerals, and descriptions of these elements are simplified or omitted.

As illustrated in FIG. 5, an adhesive layer 19 is provided on one surface 16p of the rectangular insulation paper 16A to be disposed between the coil 12 and the surface 15a defining the slot 15 while surrounding the coil 12. The adhesive layer 19 is formed, for example, by applying an epoxy type foam resin material to the surface 16p. The adhesive layer 19 is adhered to the surface 15a defining the slot 15 when the insulation paper 16A is disposed in the slot 15 as illustrated in FIG. 6.

The adhesive layer 19 is provided in a range of the area 16b excluding the both end portions 16a in the first embodiment in a direction of the short side 16s of the insulation paper 16A and is provided in an entire range in a direction of the long side 16l of the insulation paper 16A. In this embodiment, the crease 17 is formed on each of the four intended folding lines L as in the first embodiment. The crease 17 is provided at the same length as the length of an area where the adhesive layer 19 is provided in the direction of the short side 16s.

In this manner, in the insulation paper 16A of the second embodiment, folding property thereof may decrease since a thickness of the area where the adhesive layer 19 is provided increases. However, the crease 17 is provided at a folding position where the insulation paper 16A is to be folded when disposed in the slot 15 in the area where the adhesive layer 19 is provided, and thus, the insulation paper 16A can be easily folded to surround the coils 12 in the slot 15. Further, on the insulation paper 16A of the second embodiment, since the crease 17 is formed in the area 16b excluding the both end portions 16a, there is no starting point of a crack on outer sides of the both end surfaces 11a of the stator core 11. Therefore, a crack does not occur even if stress received from coil end portions 12e acts on the both end portions 16a. As described above, the insulation paper 16A of the second embodiment can prevent occurrence of a crack starting from the crease 17.

In the insulation paper 16A of the second embodiment, the length of the area where the adhesive layer 19 is provided is equal to the length of the crease 17, and the adhesive layer 19 does not protrude from the slot 15 when the insulation paper 16A is provided to the stator core 11 as illustrated in FIG. 6. Therefore, a possibility can be reduced that a part of the adhesive layer 19 peels off and separated as a foreign substance.

Third Embodiment

Figure 7:
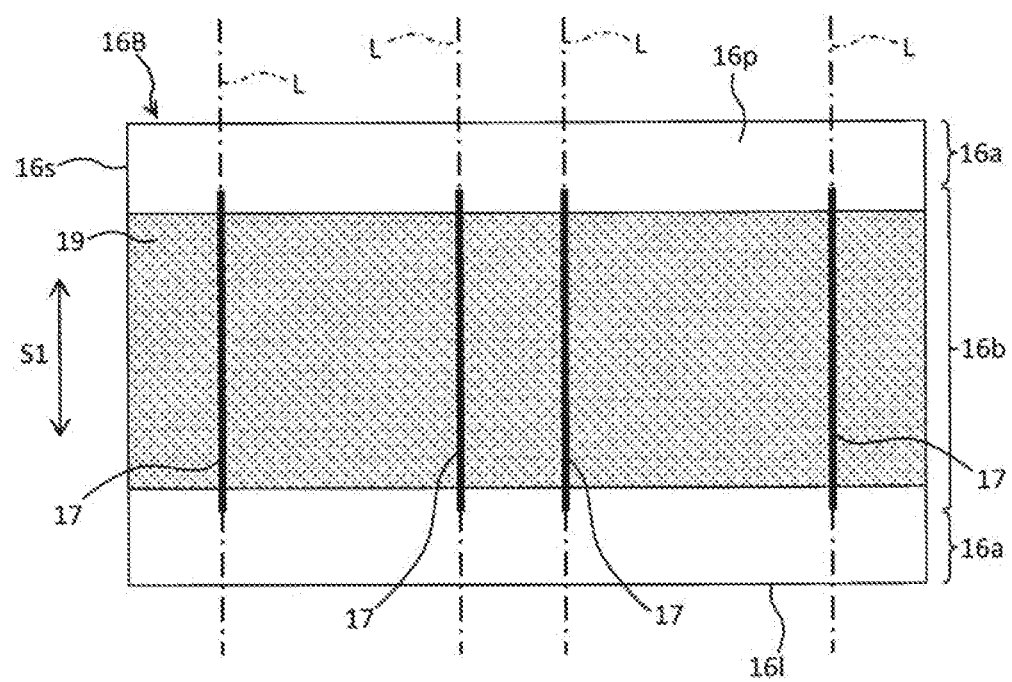
FIG. 7 is a plan view of an insulation paper according to a third embodiment.

FIG. 7 is a plan view in which an insulation paper 16B according to a third embodiment is unfolded. In the following description, elements common to those described in the second embodiment are denoted by the same reference numerals or corresponding reference numerals, and descriptions of these elements are simplified or omitted.

As illustrated in FIG. 7, the same adhesive layer 19 as in the second embodiment is provided on the surface 16p of the rectangular insulation paper 16B to be disposed between the coils 12 and the surface 15a defining the slot 15 while surrounding the coils 12. In this embodiment, a crease 17 is also formed on each of the four intended folding lines L as in the first embodiment or the second embodiment. The crease 17 has a length larger than the length of the area where the adhesive layer 19 is provided in the direction of the short side 16s, and extends to an outer side of the area.

In this manner, in the insulation paper 16B of the third embodiment, folding property thereof may decrease since thickness of the area where the adhesive layer 19 is provided increases. However, the crease 17 is provided at a folding position where the insulation paper 16B is to be folded when disposed in the slot 15 in the area where the adhesive layer 19 is provided, and thus, the insulation paper 16B can be easily folded to surround the coils 12 in the slot 15. Further, since the crease 17 is provided to extend to the outer side of the area where the adhesive layer 19 is provided, folding property thereof can be improved compared with the second embodiment. On the insulation paper 16B of the third embodiment, since the crease 17 is not formed at both ends of the stator core 11 in the axial direction, a crack does not occur even if stress received from coil end portions 12e acts on the both end portions 16a. In this manner, the insulation paper 16B of the third embodiment can prevent occurrence of a crack starting from the crease 17.

The present invention is not limited to the above embodiments, and various modifications, improvements, and the like may be appropriately made. For example, although rectangular insulation papers 16, 16A, 16B are exemplified in the above embodiments, the inventive concept of the present invention may be effectively applied to an insulation paper having other shapes. The crease 17 may be a continuous line or a broken line. Further, in the above embodiments, although it is exemplified that the crease 17 extends in parallel to the short side 16s of the insulation paper 16, the crease 17 may extend along the long side 16l of the insulation paper 16 or may be inclined with respect to the short side 16s or the long side 16l.

In the second and third embodiments, the adhesive layer 19 is provided only on one surface 16p of insulation papers 16A, 16B, but the adhesive layer 19 may be provided on both surfaces of the insulation papers 16A, 16B.

The invention claimed is:

1. An insulation paper to be disposed between a slot formed in a stator core and a coil inserted into the slot,
   wherein an adhesive layer is provided on at least one surface of the insulation paper,
   wherein a crease is provided in advance at a folding position where the insulation paper is to be folded when disposed in the slot,
   wherein the crease is provided in an area of the insulation paper excluding both end portions thereof,
   wherein the adhesive layer is provided in the area of the insulation paper excluding the both end portions thereof,
   wherein a total length of the adhesive layer, in an extending direction of the crease, is equal to a total length of the crease, and
   wherein the adhesive layer does not protrude from the slot.

2. The insulation paper according to claim 1,
   wherein the crease extends to an outer side of the adhesive layer.

3. A stator of a rotary electric machine, the stator comprising:
   a stator core including a plurality of slots in a circumferential direction thereof;
   a coil inserted into each of the slots; and
   an insulation paper according to claim 1 disposed between each of the slots and the coil, wherein the crease is provided only on an inner side of an end surface of the stator core.

\* \* \* \* \*